United States Patent
Nakaizawa (10) Patent No.: US 10,558,356 B2
(45) Date of Patent: Feb. 11, 2020

(54) DISPLAY CONTROL DEVICE AND NON-TRANSITORY COMPUTER-READABLE STORAGE MEDIUM HAVING PROGRAM RECORDED THEREON

(71) Applicant: KYOCERA Document Solutions Inc., Osaka (JP)

(72) Inventor: Tomoaki Nakaizawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 290 days.

(21) Appl. No.: 15/441,276

(22) Filed: Feb. 24, 2017

(65) Prior Publication Data

US 2017/0255380 A1 Sep. 7, 2017

(30) Foreign Application Priority Data

Mar. 2, 2016 (JP) ................................. 2016-040114

(51) Int. Cl.
*G06F 3/0488* (2013.01)
*G06F 3/0484* (2013.01)
(Continued)

(52) U.S. Cl.
CPC ........ *G06F 3/04883* (2013.01); *G06F 3/0482* (2013.01); *G06F 2203/04808* (2013.01)

(58) Field of Classification Search
CPC . G06F 3/04883; G06F 3/04845; G06F 3/0412
See application file for complete search history.

(56) References Cited

U.S. PATENT DOCUMENTS

| 5,379,372 | A | * | 1/1995 | Wu | ........................ | G06T 11/206 |
| | | | | | | 715/236 |
| 8,411,046 | B2 | * | 4/2013 | Kruzeniski | ......... | G06F 3/04845 |
| | | | | | | 345/173 |

(Continued)

FOREIGN PATENT DOCUMENTS

| JP | 2000-020212 A | 1/2000 |
| JP | 2010-186348 A | 8/2010 |

(Continued)

OTHER PUBLICATIONS

An Office Action mailed by the Japanese Patent Office on Sep. 4, 2018, which corresponds to Japanese Patent Application No. 2016-040114 and is related to U.S. Appl. No. 15/441,276.

*Primary Examiner* — Daeho D Song (74) *Attorney, Agent, or Firm* — Studebaker & Brackett PC (57) ABSTRACT

A display control device includes a display, a touch panel, and a display controller. The display displays one or more items of list information. The touch panel is attached to the display. The display controller controls the display based on an operation performed on the touch panel. The display controller determines whether or not a swipe operation has been detected. The swipe operation is a swipe that is performed on the touch panel when the display displays at least one item of list information. Upon determining that the swipe operation has been detected, the display controller controls the display to change a size of a display area of the at least one item of list information being displayed by the display and change the number of items of list information being displayed by the display.

19 Claims, 6 Drawing Sheets

(51) Int. Cl.
   *G06F 3/041*     (2006.01)
   *G06F 3/0482*    (2013.01)

(56) References Cited

U.S. PATENT DOCUMENTS

| | | | | |
|---|---|---|---|---|
| 9,323,427 | B2* | 4/2016 | Yu | G06F 3/0482 |
| 9,547,431 | B2* | 1/2017 | Eggebraaten | G06F 16/25 |
| 9,658,746 | B2* | 5/2017 | Cohn | G06F 3/0482 |
| 9,671,948 | B2* | 6/2017 | Urakawa | G06F 3/0488 |
| 9,747,270 | B2* | 8/2017 | Campbell | G06F 3/04883 |
| 9,971,499 | B2* | 5/2018 | Bernstein | G06F 3/0488 |
| 9,971,500 | B2* | 5/2018 | Yang | H04L 51/16 |
| 2007/0136654 | A1* | 6/2007 | Peters | G06F 17/211 |
| | | | | 715/217 |
| 2008/0028290 | A1* | 1/2008 | Suwiryo | G06F 3/0481 |
| | | | | 715/227 |
| 2008/0109721 | A1* | 5/2008 | Liao | G06F 3/04886 |
| | | | | 715/702 |
| 2009/0064035 | A1* | 3/2009 | Shibata | G06F 3/0481 |
| | | | | 715/803 |
| 2010/0205565 | A1 | 8/2010 | Sugamata | |
| 2011/0163968 | A1* | 7/2011 | Hogan | G06F 3/04883 |
| | | | | 345/173 |
| 2011/0167366 | A1* | 7/2011 | Wagner | G06F 3/0483 |
| | | | | 715/765 |
| 2011/0289397 | A1* | 11/2011 | Eastmond | G06F 3/0485 |
| | | | | 715/212 |
| 2012/0011437 | A1* | 1/2012 | James | G06F 1/1643 |
| | | | | 715/702 |
| 2012/0013540 | A1* | 1/2012 | Hogan | G06F 3/04883 |
| | | | | 345/173 |
| 2012/0069056 | A1 | 3/2012 | Ito | |
| 2013/0006961 | A1* | 1/2013 | McPherson | G06F 16/2428 |
| | | | | 707/714 |
| 2013/0198677 | A1* | 8/2013 | Dash | G06F 3/0488 |
| | | | | 715/776 |
| 2013/0238724 | A1* | 9/2013 | Cunningham | H04L 51/24 |
| | | | | 709/206 |
| 2014/0033093 | A1* | 1/2014 | Brauninger | G06F 3/04883 |
| | | | | 715/765 |
| 2014/0114907 | A1* | 4/2014 | Kozina | G06F 16/283 |
| | | | | 707/602 |
| 2014/0157101 | A1* | 6/2014 | Hogan | G06F 3/0481 |
| | | | | 715/227 |
| 2015/0019216 | A1* | 1/2015 | Singh | G10L 15/183 |
| | | | | 704/235 |
| 2015/0135113 | A1* | 5/2015 | Sekharan | G06F 3/0488 |
| | | | | 715/771 |
| 2016/0154575 | A1* | 6/2016 | Xie | G06F 3/04842 |
| | | | | 715/771 |
| 2016/0357390 | A1* | 12/2016 | Federighi | G06F 3/04883 |
| 2017/0010781 | A1* | 1/2017 | Bostick | G06F 17/211 |

FOREIGN PATENT DOCUMENTS

| | | |
|---|---|---|
| JP | 2012-038356 A | 2/2012 |
| JP | 2012-064092 A | 3/2012 |
| JP | 2012-123475 A | 6/2012 |

\* cited by examiner

DISPLAY CONTROL DEVICE AND NON-TRANSITORY COMPUTER-READABLE STORAGE MEDIUM HAVING PROGRAM RECORDED THEREON

INCORPORATION BY REFERENCE

The present application claims priority under 35 U.S.C. § 119 to Japanese Patent Application No. 2016-040114, filed on Mar. 2, 2016. The contents of this application are incorporated herein by reference in their entirety.

BACKGROUND

The present disclosure relates to a display control device and a non-transitory computer-readable storage medium having a program recorded thereon.

Displays capable of displaying images as variable are in widespread use. The displays are for example mounted in mobile phones, tablet computers, portable gaming devices, or the like. The displays are also mounted in CD players, DVD players, and various electronic devices as a part thereof.

A display may not be able to display an entire age on a screen at once due to screen size constraints, text size constraints, and the like. In such a situation, a user can move the displayed image within the screen using an operation section. For example, the user can move the image using a mouse or a keyboard.

In recent years, touch panels have been widely used as operation sections of displays. Upon a user operating a touch panel of a display, the touch panel detects the user's operation, and the display changes an image in accordance with the user's operation.

A known information processing device for example displays attributes of the content items together with a list of content items of a document. This information processing device is configured to display, upon a user placing a cursor on a heading in the list of the content items of the document, attributes of the content item represented by the heading on which the cursor is placed.

SUMMARY

A display control device according to the present disclosure includes a display, a touch panel, and a display controller having a processor and a storage section storing therein a control program. The display displays one or more items of list information. The touch panel is attached to the display. Through the processor executing the control program, the display controller controls the display based on an operation performed on the touch panel. The display controller determines whether or not a swipe operation has been detected. The swipe operation is a swipe that is performed on the touch panel when the display displays at least one item of list information. Upon determining that the swipe operation has been detected, the display controller controls the display to change a size of a display area of the at least one item of list information being displayed by the display and change the number of items of list information being displayed by the display.

A non-transitory computer-readable storage medium according to the present disclosure has a program recorded thereon. The program causes a computer to perform: (1) controlling a display to display at least one item of list information; (2) determining whether or not a swipe operation has been detected, the swipe operation being a swipe that is performed on a touch panel attached to the display when the display displays the at least one item of list information; and (3) controlling, upon determining that the swipe operation has been detected, the display to change a size of a display area of the at least one item of list information being displayed by the display and change the number of items of list information being displayed by the display.

DETAILED DESCRIPTION

The following describes a display control device and a program according to an embodiment of the present disclosure with reference to the drawings. However, the present disclosure is not limited to the following embodiment.

First, a display control device 100 according to the present embodiment will be described with reference to FIG. 1. The display control device 100 is for example used as a part of a smartphone or a personal computer.

Figure 1:
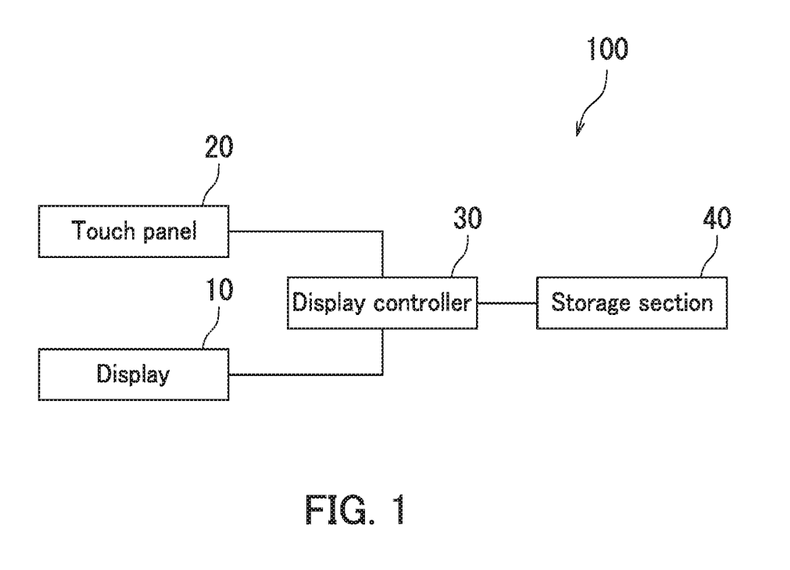
FIG. 1 is a schematic diagram of a display control device according to an embodiment of the present disclosure.

FIG. 1 is a schematic diagram of the display control device 100. The display control device 100 includes a display 10, a touch panel 20, and a display controller 30.

The display 10 displays an image. The display 10 for example displays any image on a screen thereof. Typically, the display 10 has two main surfaces and four side surfaces. The screen of the display 10 is located on one of the two main surfaces. The display 10 may be a liquid crystal display or an organic electroluminescence (EL) display.

The touch panel 20 is attached to the display 10. The touch panel 20 detects a user's operation. The touch panel 20 may be integral with the display 10. Alternatively, the touch panel 20 may be detachable from the display 10.

Typically, the touch panel 20 has two main surfaces and four side surfaces. The touch panel 20 has a transparent region from one of the two main surfaces to the other. The transparent region of the touch panel 20 is disposed over the screen of the display 10. A user of the display control device 100 can visually recognize what is displayed by the display 10 through the touch panel 20.

The user of the display control device 100 operates the touch panel 20. Typically, the user operates the touch panel 20 with a finger thereof. Typically, the user operates the touch panel 20 at a position on the screen of the display 10. Upon the user operating the touch panel 20, the touch panel 20 detects the user's operation.

The display controller 30 controls the display 10. For example, the display controller 30 changes images that are displayed by the display 10 based on a result of detection by the touch panel 20. The display controller 30 for example includes a central processing unit or an application specific integrated circuit (ASIC).

As illustrated in FIG. 1, the display control device 100 preferably further includes a storage section 40. The storage section 40 stores therein images that are displayed by the display 10. The storage section 40 may store therein a program for controlling operation of the display controller 30.

The storage section 40 for example includes a hard disk, read only memory (ROM), or random access memory (RAM). The ROM is for example programmable ROM (PROM) such as flash memory. The RAM is for example dynamic RAM (DRAM).

However, the display control device 100 does not need to include the storage section 40. The program for controlling either or both of the display controller 30 and images that are displayed by the display 10 may for example be read out of a storage device external to the display control device 100 through a communication section.

The display 10 in the display control device 100 according to the present embodiment is capable of displaying a plurality of items of list information. The user performs a swipe operation (a swipe) on the touch panel 20. Typically, the swipe is performed by a finger of the user. Particularly, the swipe is often performed by a forefinger of a dominant hand of the user. However, the swipe may be performed using a dedicated stick or any stick so long as the swipe can be detected by the touch panel 20.

Typically, the swipe is performed on the touch panel 20 leftward or rightward. The user's swipe does not necessarily be performed in a left-right direction. For example, the user's swipe may be performed in an oblique direction. In such a situation, the touch panel 20 may detect the user's swipe as a leftward swipe so long as a component having a projection in the left-right direction, among oblique components of the user's swipe in the oblique direction, includes a leftward component.

Upon the user operating the touch panel 20, the touch panel 20 detects the user's swipe. In such a situation, based on the swipe, the display controller 30 controls the display 10 to change a display area of the list information being displayed by the display 10 and change the number of items of list information being displayed by the display 10.

Figure 2:
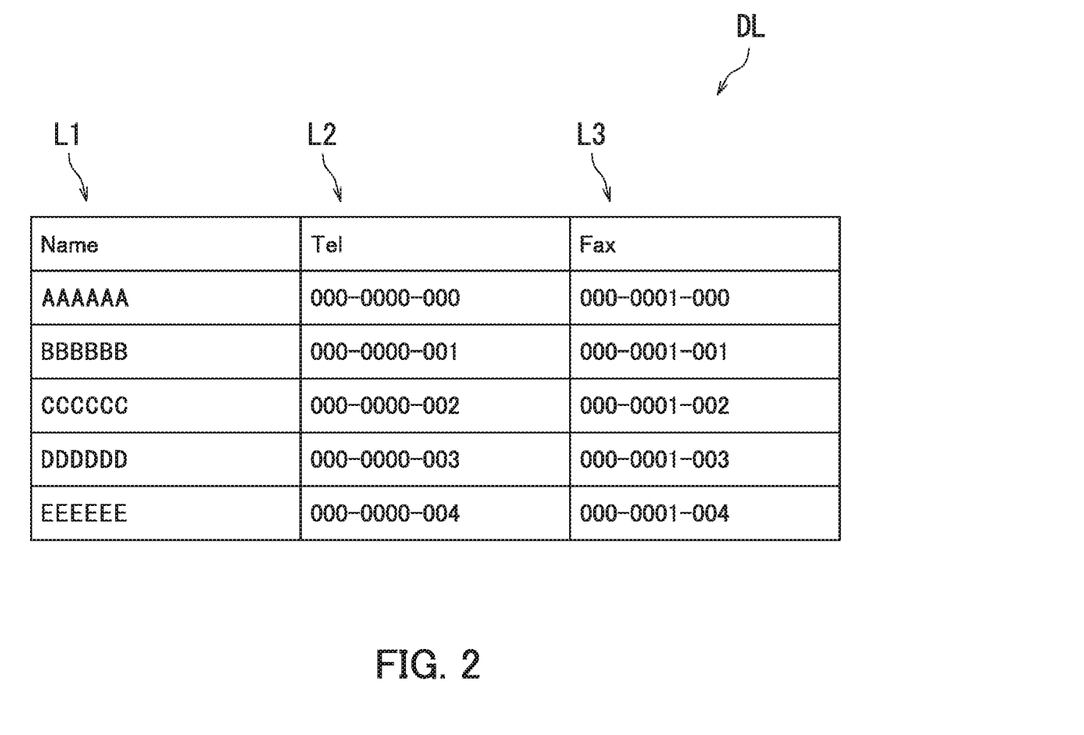
FIG. 2 is a schematic diagram illustrating an entirety of list information, which is a display target in the display control device according to the embodiment of the present disclosure.

FIG. 2 is a schematic diagram illustrating entire information DL, which is a display target in the display control device 100 according to the present embodiment. Typically, the entire information DL is stored in the storage section 40 illustrated in FIG. 1. The display controller 30 can control the display 10 such that the display 10 displays the entire information DL illustrated in FIG. 2 as necessary.

In the present embodiment, the entire information DL includes items of list information L1, list information L2, and list information L3. The items of list information L1, list information L2, and list information L3 each include a plurality of elements. The items of list information L1, list information L2, and list information L3 each has a plurality of elements arranged one above the other, that is, arranged in an up-down direction on the display 10. In the present specification, the items of list information L1, list information L2, and list information L3 may be respectively referred to as a first item of list information L1, a second item of list information L2, and a third item of list information L3.

The elements included in the list information L1 are pieces of information about a single item. However, the pieces of information of the elements in the list information L1 do not need to be the same as one another. Rather, the pieces of information of the elements in the list information L1 are preferably different from one another.

The elements in the list information L2 have pieces of information about a single item that is different from the item of the list information L1. Furthermore, the elements in the list information L3 have pieces of information about a single item that is different from the items of the list information L1 and L2.

For example, the item of the list information L1 is name, and the elements in the list information L1 have pieces of information about name. The item of the list information L2 is telephone number, and the elements in the list information L2 have pieces of information about telephone number. The item of the list information L3 is facsimile number, and the elements in the list information L3 have pieces of information about facsimile number.

The items of list information L1, list information L2, and list information L3 are associated with one another. More specifically, one line of the list information L1, the list information L2, and the list information L3 has pieces of information about one item. For example, a line of the list information L1, the list information L2, and the list information L3 has pieces of information about an item, and a different line of the list information L1, the list information L2, and the list information L3 has pieces of information about a different item.

In the present embodiment, pieces of information in the first line of the list information L1, the list information L2, and the list information L3 are pieces of information indicating the respective items of the list information. The pieces of information in the list information L1, the list information L2, and the list information L3 are name (Name), telephone number (Tel), and facsimile number (Fax), respectively.

The second line of the list information L1, the list information L2, and the list information L3 has pieces of information about a person, and the third line of the list information L1, the list information L2, and the list information L3 has pieces of information about another person. More specifically, the pieces of information in the second line of the list information L1, the list information L2, and the list information L3 are a name AAAAAA, a telephone number 000-0000-000, and a facsimile number 000-0001-000. The pieces of information in the third line of the list information L1, the list information L2, and the list information L3 are a name BBBBBB, a telephone number 000-0000-001, and a facsimile number 000-0001-001.

Typically, the list information L1 is preferably higher-priority information than the list information L2 and L3. The list information L2 is preferably higher-priority information than the list information L3. However, it is preferable that the priority between the list information L1, the list information L2, and the list information L3 can be determined by a user. Furthermore, it is preferable that the priority between the list information L1, the list information L2, and the list information L3 can be changed as necessary.

Figure 3A:
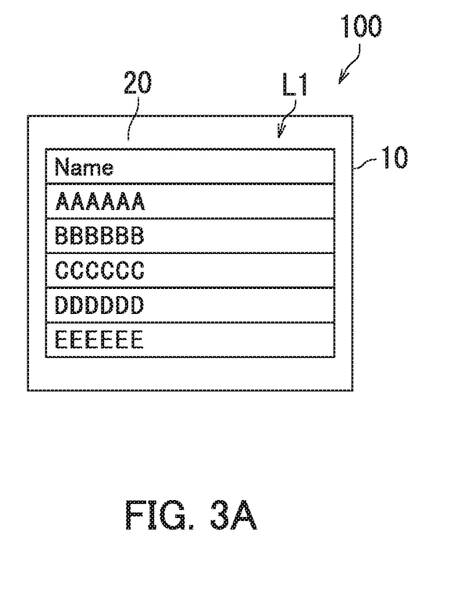
FIG. 3A is a schematic diagram illustrating the display control device before a swipe is performed.
Figure 3B:
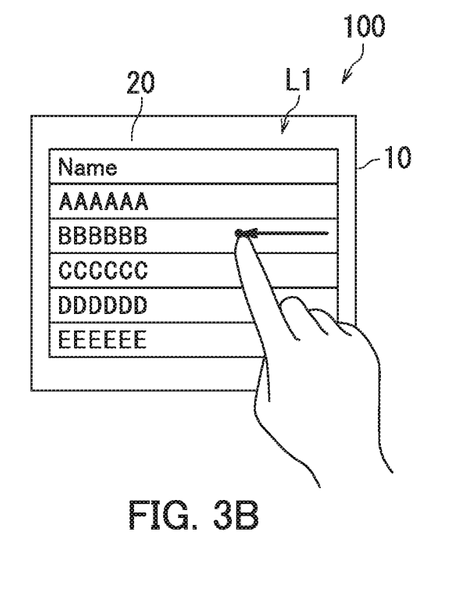
FIG. 3B is a schematic diagram illustrating the swipe performed on a touch panel.
Figure 3C:
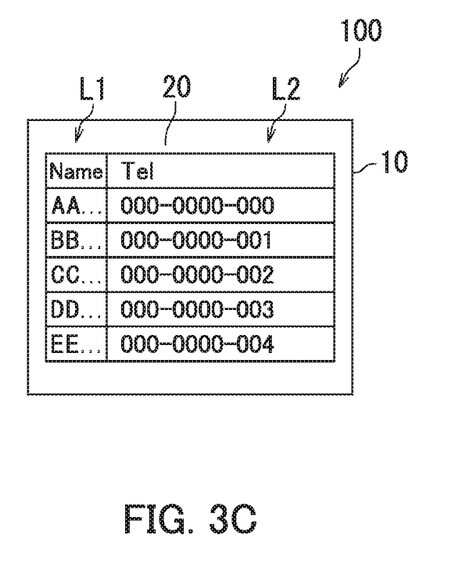
FIG. 3C is a schematic diagram illustrating the display control device after the swipe.
Figure 3D:
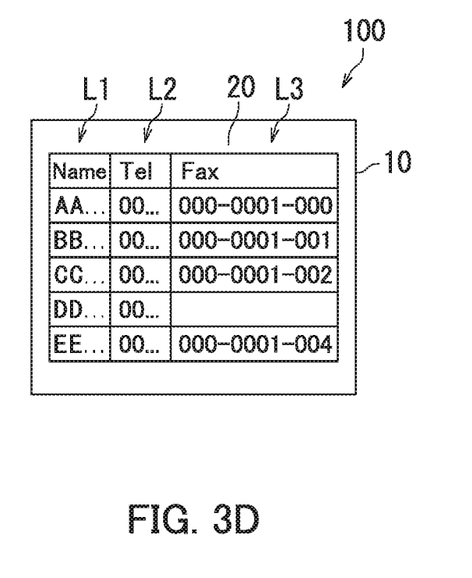
FIG. 3D is a schematic diagram illustrating the display control device after an additional swipe is performed.

The following describes operation of the display control device 100 according to the present embodiment with reference to FIGS. 1, 3A, 3B, 3C and 3D. FIG. 3A is a schematic diagram illustrating the display control device 100 before a swipe is performed. FIG. 3B is a schematic diagram illustrating the swipe performed on the touch panel 20. FIG. 3C is a schematic diagram illustrating the display control device 100 after the swipe. FIG. 3D is a schematic diagram illustrating the display control device 100 after an additional swipe is performed.

As illustrated in FIG. 3A, the display 10 is displaying the list information L1 on the entire screen. The plurality of elements in the list information L1 are arranged in the up-down direction on the screen of the display 10.

A user performs a swipe on the touch panel 20 as illustrated in FIG. 3B. Specifically, the user touches the touch panel 20 with a forefinger and moves the forefinger on the touch panel 20 leftward to perform the swipe (first swipe).

The touch panel 20 detects the user's swipe. Upon the swipe being performed on the touch panel 20, the display 10 reduces a display area of the first item of list information L1 and newly displays the list information L2 in addition to the list information L1 as illustrated in FIG. 3C. In such a situation, the display controller 30 determines that the swipe has been detected and controls the display 10 to reduce the display area of the first item of list information L1 being displayed by the display 10 and display the second item of list information L2 in addition to the first item of list information L1. Thus, the list information to be displayed can be changed readily.

In the present embodiment, the width of the display area of the first item of list information L1 (a lateral extent of the display area of the first item of list information L1) after the swipe is smaller than the width of the display area of the first item of list information L1 before the swipe. For example, a ratio between the width of the display area of the first item of list information L1 before the swipe and the width of the display area of the first item of list information L1 after the swipe is 6:1.

It should be noted that as a result of the display area of the list information L1 being reduced, all of letters included in each element in the list information L1 may not be displayed. In such a situation, it is preferable to display first some letters of the letters in each element in the list information L1. For example, it is preferable to display only first two or three letters of the letters in each element in the list information L1 in the reduced display area.

Preferably, the width of a display area of the second item of list information L2 is larger than the width of the display area of the first item of list information L1 in the display control device 100 after the swipe. In such a situation, upon determining that the swipe has been detected, the display controller 30 controls the display 10 such that the width of the display area of the second item of list information L2 is larger than the width of the display area of the first item of list information L1.

After performing one swipe, the user may perform an additional swipe on the touch panel 20. Upon the user performing the additional swipe, the display 10 reduces the display area of the second item of list information L2 and newly displays the list information L3 in addition to the list information L1 and the list information L2 as illustrated in FIG. 3D. In such a situation, upon determining that the additional swipe has been detected, the display controller 30 controls the display 10 to reduce the display area of the second item of list information L2 being displayed by the display 10 and display the third item of list information L3 in addition to the first item of list information L1 and the second item of list information L2. Thus, the list information to be displayed can be changed readily.

When the display area of the list information L2 is reduced based on the additional swipe, the width of the display area of the list information L2 may be reduced to the extent that the width of the display area of the list information L2 is substantially equal to the width of the display area of the list information L1. Preferably, after the additional swipe, the width of a display area of the third item of list information L3 in the display 10 is larger than the width of the display area of the first item of list information L1 and than the width of the display area of the second item of list information L2. In such a situation, upon determining that the additional swipe has been detected, the display controller 30 controls the display 10 such that the width of the display area of the third item of list information L3 is larger than the width of the display area of the first item of list information L1 and than the width of the display area of the second item of list information L2.

It should be noted that the display 10 does not need to display all pieces of information of the elements included in the list information. For example, the fifth line of the third item of list information L3 is blank in the display 10 illustrated in FIG. 3D. A security attribute is preset for the information in the fifth line of the list information L3 so that the information is hidden. Accordingly, the display controller 30 controls the display 10 to hide the information in the fifth line of the third item of list information L3. As described above, the display controller 30 may control the display 10 to hide some of elements in the list information L3 while displaying the others of the elements in the list information L3 based on a security attribute preset for the list information L3.

Although the display 10 displays the three items of list information (i.e., the list information L1, the list information L2, and the list information L3) in the description given above, the number of items of list information that can be displayed by the display 10 is not limited to three. The display 10 may display four or more items of list information.

In the description given above, the number of items of list information to be displayed by the display 10 is increased by one each time a user performs a swipe. However, the present disclosure is not limited to such description. The display controller 30 may cause the display 10 to increase the number of items of list information to be displayed by two or more upon determining that two or more swipes performed at the same time by a user have been detected.

Figure 4A:
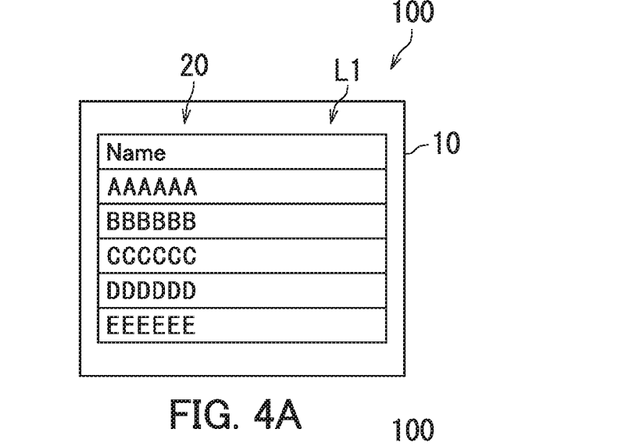
FIG. 4A is a schematic diagram illustrating the display control device before a swipe is performed.
Figure 4B:
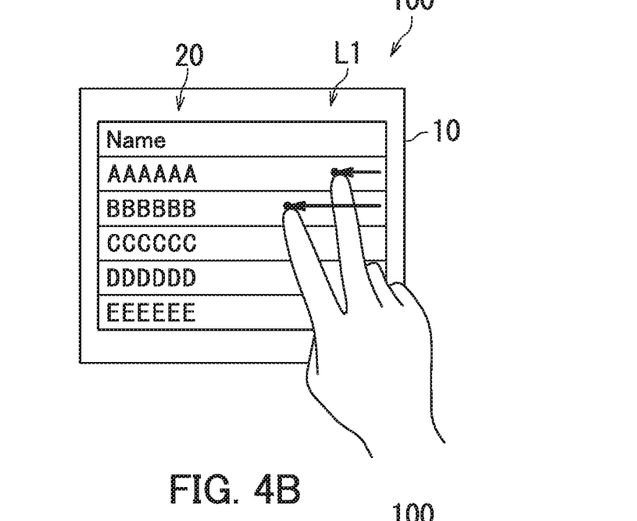
FIG. 4B is a schematic diagram illustrating simultaneous swipes performed on the touch panel.
Figure 4C:
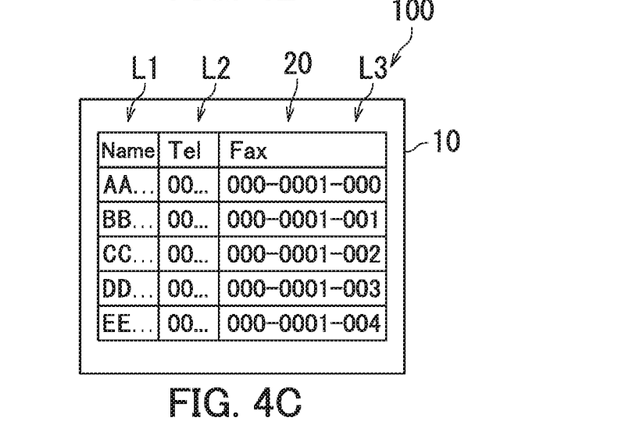
FIG. 4C is a schematic diagram illustrating the display control device after the simultaneous swipes.

The following describes operation of the display control device 100 according to the present embodiment with reference to FIGS. 1, 4A, 4B, and 4C. FIG. 4A is a schematic diagram illustrating the display control device 100 before a swipe is performed. FIG. 4B is a schematic diagram illustrating "simultaneous swipes" performed on the touch panel 20. FIG. 4C is a schematic diagram illustrating the display control device 100 after the "simultaneous swipes". The "simultaneous swipes" refer to two or more swipes performed at the same time.

As illustrated in FIG. 4A, the display 10 is displaying the list information L1. The plurality of elements in the list information L1 are arranged in the up-down direction on the screen of the display 10.

As illustrated in FIG. 4B, a user performs swipes by touching the touch panel 20 with a forefinger and a middle finger, and sliding the fingers leftward on the touch panel 20. In such a case, the touch panel 20 detects the two swipes performed at the same time. In the description in the present specification, two or more swipes that are performed at the same time may be referred to as "simultaneous swipes".

Upon the simultaneous swipes, the display 10 reduces the display area of the list information L1 and newly displays the list information L2 and the list information L3 in addition to the list information L1 as illustrated in FIG. 4C. In such a situation, upon determining that the simultaneous swipes have been detected, the display controller 30 controls the display 10 to reduce the display area of the first item of list information L1 being displayed by the display 10 and display the second item of list information L2 and the third item of list information L3 in addition to the first item of list information L1. Thus, the list information to be displayed can be changed readily. In the present embodiment, the width of the display area of the list information L3 is larger than the width of the display area of the list information L1 and than the width of the display area of the list information L2, and the width of the display area of the list information L2 is substantially equal to the width of the display area of the list information L1.

In the description given above with reference to FIGS. 4A to 4C, a user performs two swipes on the touch panel 20 at the same time, and the number of items of list information to be displayed by the display 10 is increased by two. However, the present disclosure is not limited to such description. For example, a user may perform three or more swipes on the touch panel 20 at the same time, and the number of items of list information to be displayed by the display 10 may be increased by three or more. Alternatively, even when a user performs three or more swipes on the touch panel 20 at the same time, the number of items of list information to be displayed by the display 10 may be increased only by two.

In the description given above, in order to avoid overcomplicating the description, the display 10 displays only the list information L1 at least at the time when a user performs a swipe on the touch panel 20 for the first time. However, the present disclosure is not limited to such description. The display 10 may display two or more items of list information at least at the time when a user performs a swipe on the touch panel 20 for the first time, and the number of items of list information to be displayed by the display 10 may be changed based on the swipe. For example, before the user performs a swipe for the first time, the display 10 may display the list information L1 and the list information L2 at the same time as illustrated in FIG. 3C.

In the description given above, the display 10 reduces the display area of the previously displayed item of list information and newly displays another item of list information upon detection of a swipe in one direction performed on the touch panel 20. However, the present disclosure is not limited to such description. The display 10 may reduce the number of items of list information being displayed and enlarge the display area of the list information remaining displayed, upon detection of a swipe in a different direction from the swipe for reducing the display area of the list information.

Figure 5A:
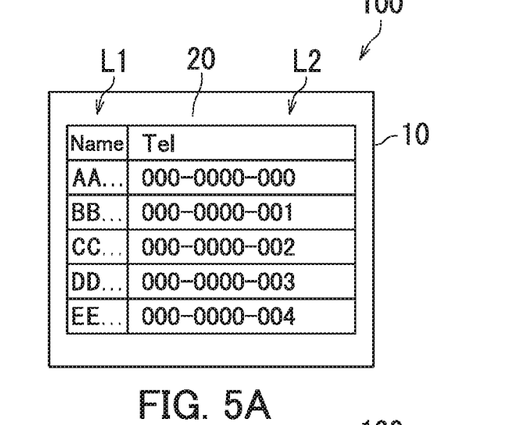
FIG. 5A is a schematic diagram illustrating the display control device before a reverse swipe is performed.
Figure 5B:
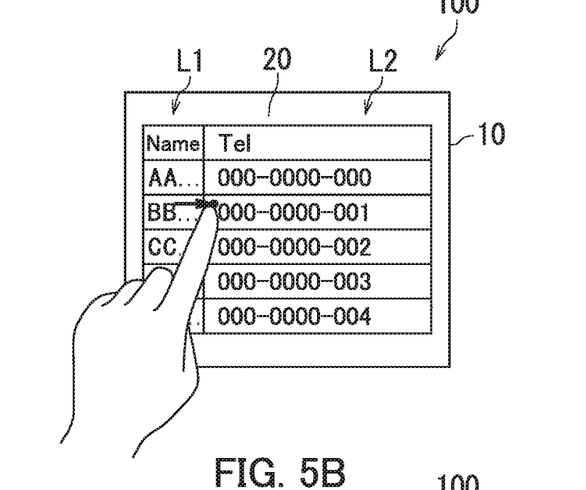
FIG. 5B is a schematic diagram illustrating the reverse swipe performed on the touch panel.
Figure 5C:
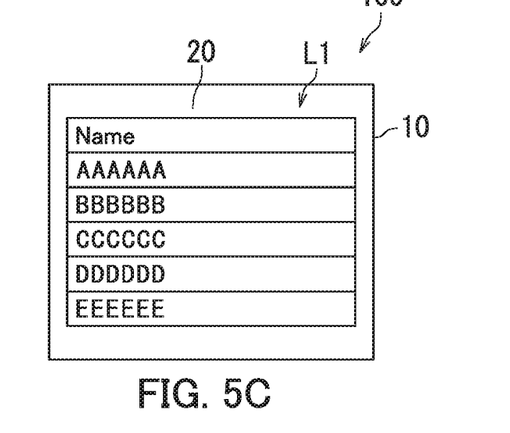
FIG. 5C is a schematic diagram illustrating the display control device after the reverse swipe.

The following describes operation of the display control device 100 according to the present embodiment with reference to FIGS. 5A, 5B, and 5C. FIG. 5A is a schematic diagram illustrating the display control device 100 before a "reverse swipe" is performed. FIG. 5B is a schematic diagram illustrating the "reverse swipe" performed on the touch panel 20. FIG. 5C is a schematic diagram illustrating the display control device 100 after the "reverse swipe". The "reverse swipe" in the present embodiment refers to a rightward swipe.

As illustrated in FIG. 5A, the display 10 is displaying the list information L1 and the list information L2. Both the plurality of elements in the list information L1 and the plurality of elements in the list information L2 are arranged in the up-down direction on the screen of the display 10. In the present embodiment, the width of the display area of the second item of list information L2 is larger than the width of the display area of the first item of list information L1.

A user performs a swipe on the touch panel 20 as illustrated in FIG. 5B. In this case, the user performs a rightward swipe. In the present specification, a rightward swipe (second swipe) may be referred to as a "reverse swipe".

Upon the touch panel 20 detecting a reverse swipe, the display 10 deletes the second item of list information L2 and enlarges the display area of the first item of list information L1 in the display 10 as illustrated in FIG. 5C. In such a situation, upon determining that the reverse swipe has been detected, the display controller 30 determines that the reverse swipe has been detected and controls the display 10 to display the first item of list information L1 in the enlarged display area without displaying the second item of list information L2. Thus, the list information to be displayed can be changed readily. As described above, the second swipe is preferably a swipe in an opposite direction to the direction of the first swipe.

In the description given with reference to FIGS. 1 and 5A to 5C, the user performs the reverse swipe with one finger, and the display 10 deletes the displayed list information L2 based on the reverse swipe. However, the present disclosure is not limited to such description. In a situation in which the display 10 is displaying three or more items of list information, the user may perform reverse swipes with two fingers, and the display 10 may delete two of the three or more items of list information upon detection of the reverse swipes.

As will be appreciated from the description given above with reference to FIGS. 1 to 5C, in the display control device 100 according to the present embodiment, the list information L2 may be newly added to the right of the list information L1 in the display 10 upon a user performing a leftward swipe, and the list information L2 may be deleted from the screen of the display 10 upon a user performing a rightward swipe.

As described above, the storage section 40 illustrated in FIG. 1 may store therein a program for controlling operation of the display controller 30. The storage section 40 in the display control device 100 according to the present embodiment may store therein a computer program for controlling displaying by the display 10 based on a user's operation.

The display controller 30 (computer) may control the display 10 as described below. (1) The display 10 displays list information. (2) Upon determination that a swipe performed on the touch panel 20 when the display 10 displays the list information has been detected, a display area of the list information being displayed by the display 10 is changed and the number of items of list information being displayed by the display 10 is changed based on the swipe.

Figure 6:
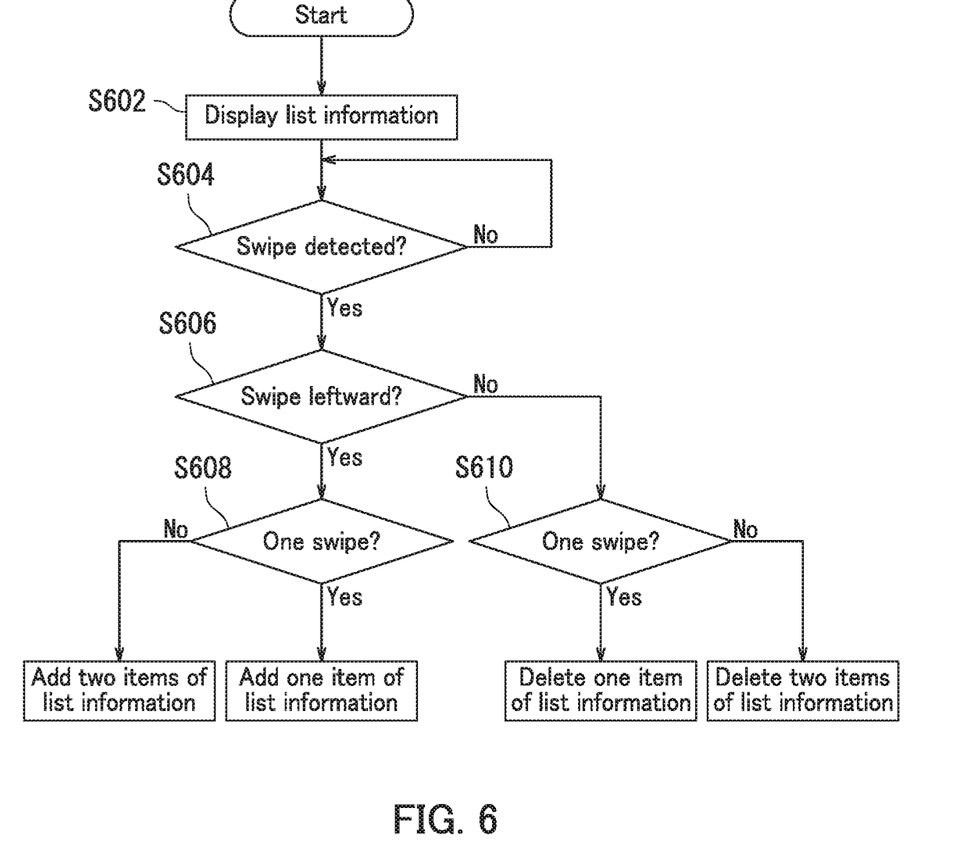
FIG. 6 is a flowchart illustrating a process to be performed by a program according to the embodiment of the present disclosure.

The following describes a flowchart illustrating a process to be performed through a program according to the present embodiment with reference to FIGS. 1 and 6. FIG. 6 is a flowchart illustrating a process to be performed through the program according to the present embodiment. The display controller 30 may perform operation illustrated in FIG. 6 through reading the stored program.

In Step S602, the display controller 30 controls the display 10 to display list information. The display 10 may display two or more items of list information. The display controller 30 may for example control the display 10 to display list information based on a result of detection by the touch panel 20.

Next, in Step S604, the display controller 30 determines whether or not the touch panel 20 has detected a swipe. If the display controller 30 determines that the touch panel 20 has not detected a swipe (No in Step S604), the display controller 30 re-determines whether or not the touch panel 20 has detected a swipe.

If the display controller 30 determines that the touch panel 20 has detected a swipe (Yes in Step S604), the display controller 30 determines whether or not the swipe is leftward in Step S606. If the swipe is leftward (Yes in Step S606), the display controller 30 determines whether or not the number of swipes performed on the touch panel 20 is one.

If the number of swipes performed on the touch panel 20 is one (Yes in Step S608), the display controller 30 controls the display 10 to reduce the display area of at least one item of list information of the list information being displayed by the display 10 and increase the number of items of list information being displayed by the display 10 by one.

If the number of swipes performed on the touch panel 20 is not one (No in Step S608), the display controller 30 controls the display 10 to reduce the display area of at least one item of list information of the list information being displayed by the display 10 and increase the number of items of list information being displayed by the display 10 by two.

If the swipe is not leftward (No in Step S606), the display controller 30 determines whether or not the number of swipes performed on the touch panel 20 is one in Step S610.

If the number of swipes performed on the touch panel 20 is one (Yes in Step S610), the display controller 30 controls the display 10 to enlarge the display area of at least one item of list information of the list information being displayed by the display 10 and reduce the number of items of list information being displayed by the display 10 by one.

If the number of swipes performed on the touch panel 20 is not one (No in Step S610), the display controller 30 controls the display 10 to enlarge the display area of at least one item of list information of the list information being displayed by the display 10 and reduce the number of items of list information being displayed by the display 10 by two.

In the description given above, each item of list information that is displayed by the display 10 has a plurality of elements arranged one above the other, that is, arranged in the up-down direction. However, the present disclosure is not limited to such description. Each item of list information that is displayed by the display 10 may have a plurality of elements arranged side-by-side, that is, arranged in a left-right direction.

In the description given above, a plurality of items of list information that are displayed by the display 10 are arranged in the left-right direction of the touch panel 20. However, the present disclosure is not limited to such description. A plurality of items of list information that are displayed by the display 10 may be arranged in the up-down direction of the touch panel 20. In such a configuration, a swipe may be performed in the up-down direction on the touch panel 20, and the length of the display area of the list information (a dimension of the display area of the list information in the up-down direction) may be changed based on the swipe.

In the description given above with reference to the drawings, the display 10 displays one or more items of list information on the entire screen. However, the present disclosure is not limited to such description. The display 10 may display one or more items of list information in one window within the display 10.

Furthermore, no particular limitations are placed on the form of the display control device 100 according to the present embodiment. The display control device 100 may be used as a part of a smartphone or a tablet computer. Alternatively, the display control device 100 may be used as a part of a CD player, a DVD player, and any of various electronic devices. For example, the display control device 100 may be used as a part of an image forming apparatus. More specifically, the image forming apparatus including the display control device 100 may be multifunctional, having either or both of a scanner function and a facsimile machine function as well as a printer function or a copier function.

What is claimed is:

1. A display control device, comprising:
a display configured to display one or more items of list information including a first item of list information and a second item of list information, the first item of list information and the second item of list information including elements arranged in a column of a table;
a touch panel attached to the display; and
a display controller having a processor and a storage section storing therein a control program, wherein
through the processor executing the control program, the display controller controls the display based on an operation performed on the touch panel,
the display controller determines whether or not a swipe operation has been detected, the swipe operation being a swipe that is performed on the touch panel when the display displays at least one item of list information,
upon determining that the swipe operation has been detected, the display controller controls the display to change a width of a display area of the at least one item of list information being displayed in the column of the table and change the number of items of list information being displayed in the column of the table, wherein
each of the elements in the first item of list information are associated with each of the elements in the second item of list information in corresponding rows of the table, and wherein
in response to detecting the swipe operation, the display controller controls the display to reduce a width of a display area of a particular item of the at least one item of list information so as to display first some letters of all letters included in the elements of the particular item while displaying a suspension point in place of remaining letters of the letters included in the elements in the particular item.

2. The display control device according to claim 1, wherein
the display controller determines whether or not a first swipe operation has been detected, the first swipe operation being a swipe operation that is performed on the touch panel when the display displays the first item of list information, and
upon determining that one first swipe operation has been detected, the display controller controls the display to reduce a width of a display area of the first item of list information being displayed in the column of the table so as to display first some letters of all letters included in the elements of the first item of list information while displaying a suspension point in place of remaining letters of the letters included in the elements of the first item of list information, and display the second item of list information in addition to the first item of list information, the second item of list information being associated with the first item of list information.

3. The display control device according to claim 2, wherein
upon determining that the one first swipe operation has been detected, the display controller controls the display such that a width of a display area of the second item of list information is larger than the width of the display area of the first item of list information.

4. The display control device according to claim 1, wherein
the display controller determines whether or not a first swipe operation has been detected, the first swipe operation being a swipe operation that is performed on the touch panel when the display displays the first item of list information, and
upon determining that two first swipe operations performed at different times have been detected, the display controller controls the display to reduce a width of a display area of the first item of list information being displayed in the column of the table so as to display first some letters of all letters included in the elements of the first item of list information while displaying a suspension point in place of remaining letters of the letters included in the elements of the first item of list information, and display the second item of list information and a third item of list information in addition to the first item of list information, the second and third items of list information being associated with the first item of list information.

5. The display control device according to claim 4, wherein
upon determining that the two first swipe operations performed at different times have been detected, the display controller controls the display such that a width of a display area of the third item of list information is larger than the width of the display area of the first item of list information and than a width of a display area of the second item of list information.

6. The display control device according to claim 5, wherein
upon determining that the two first swipe operations performed at different times have been detected, the display controller controls the display such that the width of the display area of the second item of list information is substantially the same in size as the width of the display area of the first item of list information.

7. The display control device according to claim 1, wherein
the display controller determines whether or not a first swipe operation has been detected, the first swipe operation being a swipe operation that is performed on the touch panel when the display displays the first item of list information, and
upon determining that two first swipe operations performed at the same time have been detected, the display controller controls the display to reduce a width of a display area of the first item of list information being displayed in the column of the table so as to display first some letters of all letters included in the elements of the first item of list information while displaying a suspension point in place of remaining letters of the letters included in the elements of the first item of list information, and display the second item of list information and a third item of list information in addition to the first item of list information, the second and third items of list information being associated with the first item of list information.

8. The display control device according to claim 7, wherein
upon determining that the two first swipe operations performed at the same time have been detected, the display controller controls the display such that a width of a display area of the third item of list information is larger than the width of the display area of the first item of list information and than a width of a display area of the second item of list information.

9. The display control device according to claim 8, wherein
upon determining that the two first swipe operations performed at the same time have been detected, the display controller controls the display such that the width of the display area of the second item of list information is substantially the same in size as the width of the display area of the first item of list information.

10. The display control device according to claim 2, wherein
the display controller determines whether or not a second swipe operation has been detected, the second swipe operation being a swipe operation that is performed on the touch panel when the display displays the first item of list information and the second item of list information, and
upon determining that one second swipe operation has been detected, the display controller controls the display to enlarge the width of the display area of the first item of list information and display the first item of list information without displaying the second item of list information.

11. The display control device according to claim 10, wherein
the second swipe operation is a swipe operation in an opposite direction to a direction of the first swipe operation.

12. The display control device according to claim 1, wherein
each of the one or more items of list information includes a plurality of elements arranged in an up-down direction on the display.

13. The display control device according to claim 12, wherein
the first swipe operation is a leftward or rightward swipe operation on the touch panel.

14. The display control device according to claim 1, wherein
the display controller controls the display to hide some of elements in the one or more items of list information while displaying others of the elements in the one or more items of list information based on a security attribute preset for the one or more items of list information.

15. A non-transitory computer-readable storage medium having a program recorded thereon, the program being configured to cause a computer to perform:
controlling a display to display at least one item of list information including a first item of list information and a second item of list information, the first item of list information and the second item of list information including elements arranged in a column of a table;

determining whether or not a swipe operation has been detected, the swipe operation being a swipe that is performed on a touch panel attached to the display when the display displays the at least one item of list information; and controlling, upon determining that the swipe operation has been detected, the display to change a width of a display area of the at least one item of list information being displayed in the column of the table and change the number of items of list information being displayed in the column of the table, wherein each of the elements in the first item of list information are associated with each of the elements in the second item of list information in corresponding rows of the table, and wherein in response to detecting the swipe operation, the display controller controls the display to reduce a width of a display area of a particular item of the at least one item of list information so as to display first some letters of all letters included in the elements of the particular item while displaying a suspension point in place of remaining letters of the letters included in the elements in the particular item.

16. The display control device according to claim 1, wherein the elements of at least one of the first item of list information and the second item of list information include elements about any of names, telephone numbers, and fax numbers.

17. The non-transitory computer-readable storage medium according to claim 15, wherein the elements of at least one of the first item of list information and the second item of list information include elements about any of names, telephone numbers, and fax numbers.

18. The display control device according to claim 1, wherein the display displays at least a portion of each of the elements in the first item of list information with the first item of list information fixed at a leftmost location among the one or more items of list information while changing the width of the display area of the at least one item of list information displayed in the column of the table and changing the number of items of list information displayed in the column of the table.

19. The non-transitory computer-readable storage medium according to claim 15, wherein the display displays at least a portion of each of the elements in the first item of list information with the first item of list information fixed at a leftmost location among the one or more items of list information while changing the width of the display area of the at least one item of list information displayed in the column of the table and changing the number of items of list information displayed in the column of the table.

* * * * *